United States Patent [19]
Johnson

[11] Patent Number: 5,318,472
[45] Date of Patent: Jun. 7, 1994

[54] FISH SCALING DEVICE

[76] Inventor: Israel C. Johnson, 2814 E. West Ave., Shreveport, La. 71107

[21] Appl. No.: 992,568

[22] Filed: Dec. 18, 1992

[51] Int. Cl.$^5$ .................. A22C 25/00; A22C 25/02
[52] U.S. Cl. .................... 452/99; 452/101; 452/105; 452/195
[58] Field of Search ............. 452/98, 99, 102, 101, 452/105, 194, 195, 196

[56] References Cited

U.S. PATENT DOCUMENTS

| | | | |
|---|---|---|---|
| 1,982,083 | 11/1934 | Strand | 17/5 |
| 2,557,272 | 6/1951 | Gabriel | 17/5 |
| 2,655,689 | 10/1953 | Witte | 17/5 |
| 2,928,118 | 3/1960 | Hairston | 452/81 |
| 3,248,751 | 5/1966 | Wilborn | 17/8 |
| 3,445,885 | 5/1969 | Reitz | 17/70 |
| 3,518,719 | 7/1970 | Anderson | 17/70 |
| 3,740,794 | 6/1973 | Smith | 17/70 |
| 3,790,988 | 2/1974 | Maxwell | 17/70 |
| 3,833,967 | 9/1974 | Kieser | 17/70 |
| 4,619,019 | 10/1986 | Hardy | 452/101 |

FOREIGN PATENT DOCUMENTS

| | | | |
|---|---|---|---|
| 614124 | 6/1935 | Fed. Rep. of Germany | 452/98 |
| 828656 | 5/1938 | France | 452/101 |

Primary Examiner—Willis Little
Attorney, Agent, or Firm—John M. Harrison

[57] ABSTRACT

A fish scaling device which is characterized by a flat support designed to receive a fish for scaling, a tail clamp adjustably mounted on one end of the support for clamping the tail of the fish to the support and a head clamp located at the opposite end of the support for immobilizing the head of the fish. In a preferred embodiment a scaling device which includes an electric motor, to which is attached a scaling tool, is used for scaling the fish. In another preferred embodiment a transparent cover is fitted over the support and the fish to be scaled and a slot is provided in a scaling panel hinged to the support, such that the scaler can be moved from side-to-side along the support to scale the fish when the cover is used to prevent scattering of the scales.

4 Claims, 1 Drawing Sheet

U.S. Patent        June 7, 1994        5,318,472
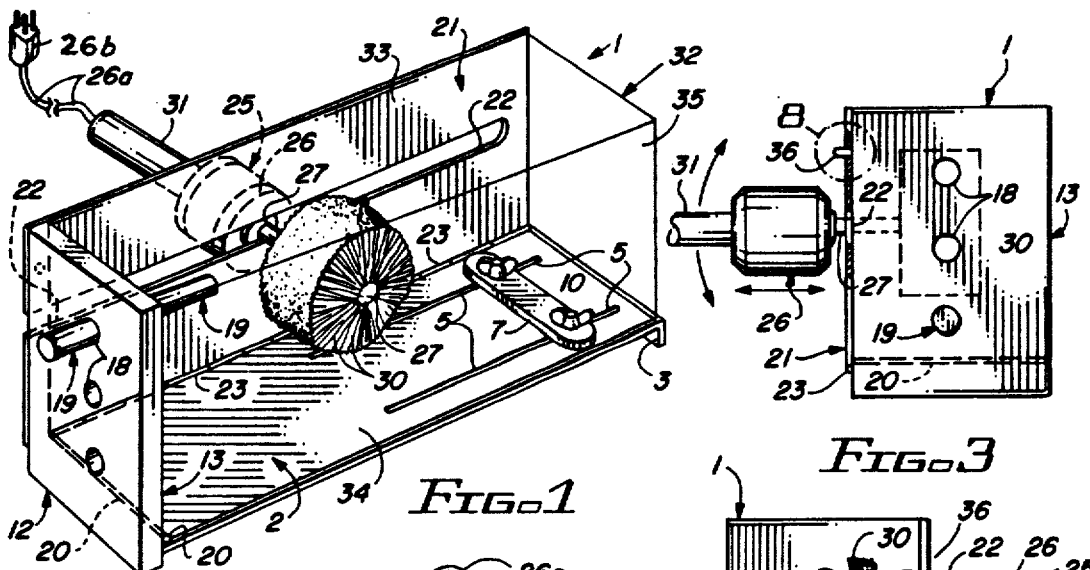
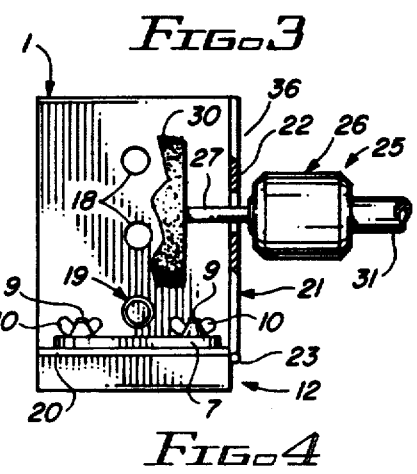
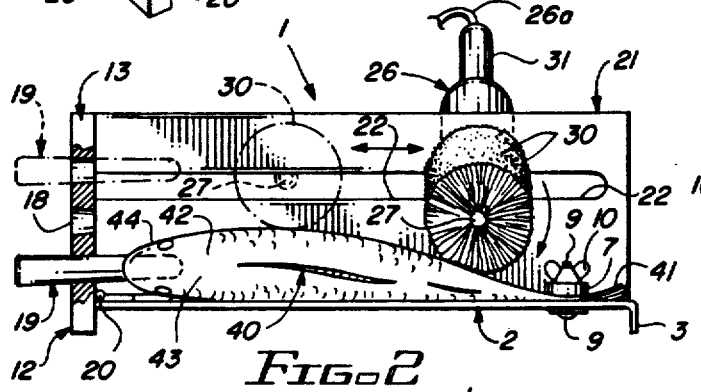
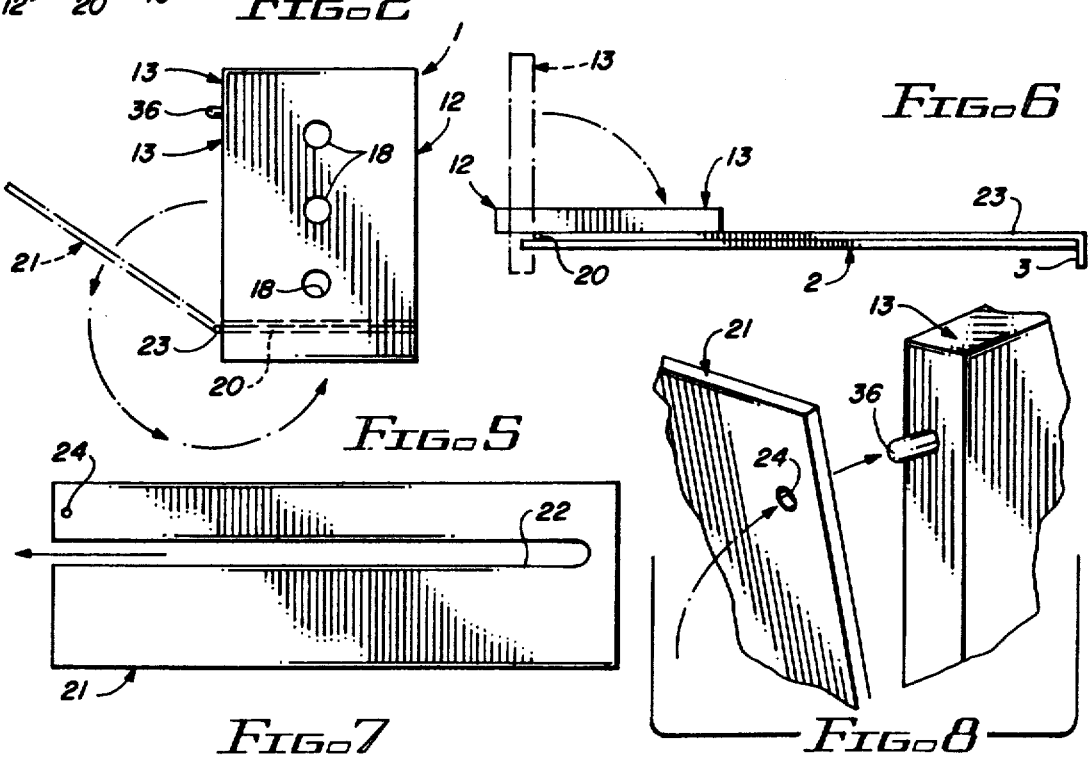
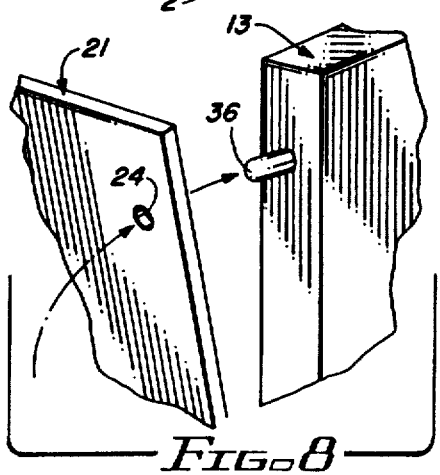

FISH SCALING DEVICE

BACKGROUND OF THE INVENTION

1. Field of the Invention

This invention relates to scaling fish and more particularly, to a fish scaling device which is characterized in a first preferred embodiment by a base or support for receiving a fish, an adjustable tail clamp located on one end of the support for clamping the tail of the fish to the support and a head clamp attached to the opposite end of the support for securing the head of the fish to the support. In another preferred embodiment a scaling mechanism is used for removing scales from the fish, which is immobilized on the support. In yet another preferred embodiment of the invention the scaling device is characterized by an electric motor having a handle and a rotating scaling tool and a removable, transparent cover may be positioned over the base to contain the removed scales. In a most preferred embodiment a scaling panel may be hinged to the base and fitted with a longitudinal slot to access the scaling tool and close one side of the support when the cover is deployed over the support.

One of the problems realized in scaling fish is the difficulty of immobilizing the fish during the scaling operation. Another problem is the difficulty of obtaining a scaling tool which is sufficiently versatile to scale fish of any desired size with a desired degree of efficiency and minimum effort. Fish are typically scaled by securing the body of the fish on a flat surface with one hand and using a spoon or other scaling implement to scrape the scales from the fish in a laborious, tedious and inefficient manner. Regardless of the degree of care utilized in the scaling operations, scales are scattered throughout the area and scales invariably remain on the fish and are difficult to detect until the fish is cooked, at which time they appear as opaque, hard, white flecs on the cooked fish. The scaler may also inadvertently contact the hand, resulting in injury.

2. Description of the Prior Art

Various scaling devices are known in the art for scaling fish. U.S. Pat. No. 1,982,083, dated Nov. 27, 1934, to O. V. Strand, details a "Fish Scaling Device" which includes a handle, a housing extending from the handle and a cylindrical, rotating scaling member positioned in the housing and rotatably attached to an electric motor for scaling fish. U.S. Pat. No. 2,557,272, dated Jun. 19, 1951, to J. Gabriel, details a "Fish Scaler" of similar design, the scaling portion of which is fitted with curved blades that are serrated for contacting and removing scales from fish. Another fish scaling device is detailed in U.S. Pat. No. 2,655,689, dated Oct. 20, 1953, to W. R. Witte. The fish scaling device is characterized by an electric motor and a scaling mechanism, complete with handle attached to the electric motor by means of a flexible cord. U.S. Pat. No. 3,248,751, dated May 3, 1966, to J. D. Wilborn, details another fish cleaning device. The device includes a flat board fitted with adjustable head and tail-securing portions that immobilize the head and tail of the fish for manual scaling. A "Fish-Holding Device" is detailed in U.S. Pat. No. 3,445,885, dated May 27, 1969, to A Reitz. The device includes a flat board provided with a clamp for engaging and immobilizing the tail of a fish and a spring and retainer member for engaging the head of a fish and securing the fish for scaling. U.S. Pat. No. 3,518,719, dated Jul. 7, 1970, to D. D. Anderson details a "Fish Holding Rack". The rack includes a frame for receiving a fish and having a clip at one end for immobilizing the tail and a second clip at the opposite end for immobilizing the head, so the fish can be scaled manually. U.S. Pat. No. 3,740,794, dated Jun. 26, 1973, to George R. Smith, details a "Fish Fillet Aid". The device includes an L-shaped base member for supporting the fish in a vertical position and clamps to rigidly hold the fish at its head, body and tail portions to the base member. The fish is thusly immobilized for manual scaling. U.S. Pat. No. 3,790,988, dated Feb. 12, 1974, to Neal J. Maxwell details an "Anchor For Holding a Fish While Working On The Same". The fish retainer includes the combination of a support for a fish, including a board or table top and an anchor for yielding holding the fish on the top surface of the support when it is desired to skin, fillet or scale the fish. The anchor includes a stem which extends rearwardly through the mouth of the fish and the free end of the stem abuts the rear wall of the stomach cavity of the fish. The stem forces the fish against the support. U.S. Pat. No. 3,833,967, dated Sep. 10, 1974, to Lester C. Kieser, details a "Fish Cleaning Board". The device includes a board, against which the body of the fish is placed, a hook at one end of the board for holding the head of the fish and a dual purpose tool removably clamped on the board adjacent to the opposite end of the board for confining the body of the fish during scaling or skinning.

It is an object of this invention to provide a fish scaling device which is characterized by a flat base or support for receiving a fish to be scaled, an adjustable tail clamp for securing the tail of the fish to the base and an adjustable head clamp for engaging the fish and securing the head portion of the fish to the base.

Another object of this invention is to provide a new and improved fish scaling device which is characterized by a support fitted with adjustable tail and head clamps for immobilizing a fish to be scaled on the support member, a transparent cover removably fitted over the support member and engaging a scaling panel hinged to the support and provided with an open-ended slot for receiving a scaling implement and scaling the fish inside the transparent cover.

Yet another object of this invention is to provide a new and improved, portable fish scaling device which includes flat support for receiving a fish, an adjustable tail clamp characterized by a tail clamp bar seated on the support and made adjustable by a pair of parallel slots for receiving bolts extending through the tail clamp bar and fitted with wing nuts for securing the tail of the fish to the support, a head clamp fixed or hinged to the support and provided with multiple openings for receiving a tapered dowel that extends through the head clamp openings into the mouth of the fish and immobilizes the head of the fish and a rotating scaler which includes an electric motor having a handle and a shaft, to which shaft is attached a rotating scaling tool for removing the scales from the fish immobilized on the support.

Still another object of this invention is to provide a fish scaling device which includes a flat support for receiving and supporting a fish, an adjustable tail clamp characterized by a tail clamp bar resting on the support and made adjustable by a pair of parallel slots that receive bolts extending through the tail clamp bar and fitted with wing nuts for securing the tail of the fish to the support, a head clamp secured to the opposite end of the support and provided with multiple openings for receiving a tapered dowel that extends through the head clamp openings, into the mouth of the fish and immobilizes the head of the fish, a scaling panel hinged to one edge of the support and an open-ended, horizontal slot located in the scaling panel, an L-shaped, transparent housing shaped to fit over the support and engage the scaling panel and a scaler which includes an electric motor, to the shaft of which is attached a rotating scaling tool for removing the scales from the fish immobilized on the base as the shaft projects through the slot in the scaling panel.

SUMMARY OF THE INVENTION

These and other objects of the invention are provided in a fish scaling device which is characterized by a flat support, with parallel slots provided at one end of the support and a tail clamp bar mounted by means of bolts and wing nuts in the slots to adjustably secure the tail of a fish on the support, a head clamp fixed to the support and provided with multiple openings for receiving a wedge-shaped dowel extending through a head clamp opening into the mouth of the fish to immobilize the head of the fish on the base, a plastic cover for insertion over the fish on the base and a slotted sealing panel hinged to the support for receiving a rotating scaling tool driven by an electric motor and scaling the fish without scattering the scales.

BRIEF DESCRIPTION OF THE DRAWING

The invention will be better understood by reference to the accompanying drawing, wherein:

FIG. 1 is a perspective view of a preferred embodiment of the fish scaling device of this invention;

FIG. 2 is a side view of the fish scaling device illustrated in FIG. 1, with a fish immobilized in the fish scaling device for scaling by an electric scaler;

FIG. 3 is a left end view of the fish scaling device illustrated in FIGS. 1 and 2;

FIG. 4 is a right end view of the fish scaling device illustrated in FIGS. 1 and 2;

FIG. 5 is an end view of a preferred head clamp for immobilizing the head of the fish illustrated in FIG. 2;

FIG. 6 is a side view of the base and a preferred hinged head clamp component of the fish scaling device illustrated in FIGS. 1 and 2;

FIG. 7 is a side view of a preferred scaling panel for enclosing one side of the fish scaling device illustrated in FIG. 2; and FIG. 8 is an enlarged perspective view, partially in section, of a preferred technique for securing the slotted scaling panel to the head clamp pedestal.

DESCRIPTION OF THE PREFERRED EMBODIMENTS

Referring to the drawing, the fish scaling device of this invention is generally illustrated by reference numeral 1 and includes a flat support member 2 for supporting a fish 40, as illustrated in FIG. 2. In a preferred embodiment of the invention an end flange 3 is provided along one edge of the support member 2 and a head clamp pedestal 13 element of a head clamp 12 is hinged to the opposite edge of the support member 2 by means of a pedestal hinge 20. A pair of parallel tail clamp slots 5 are located in the support member 2 for receiving a pair of bar bolts 9, which extend through spaced openings (not illustrated) located in a tail clamp bar 7 which spans the tail clamp slots 5. Accordingly, as illustrated in FIGS. 1 and 2, the tail 41 of the fish 40 can be inserted between the tail clamp bar 7 and the support member 2 and between the tail clamp slots 5, as the body portion 42 of the fish 40 rests on the support member 2. A pair of wing nuts 10, which are threaded on the ends of the bar bolts 9, are then tightened to secure the tail clamp bar 7 tightly against the tail 41. It will be further appreciated from a consideration of FIGS. 1 and 2 that the bar bolts 9 and tail clamp bar 7 can be slidably adjusted along the support member 2 between the tail clamp slots 5 to accommodate a fish 40 of greater or lesser length.

Referring again to FIGS. 1, 3, 4 and 5 of the drawing, in another preferred embodiment of the invention a scaling panel 21 is attached to one edge of the support member 2 by means of a panel hinge 23 to facilitate scaling the fish 40 with the scaling panel 21 in an upright configuration or hinged downwardly in a horizontal configuration, substantially coplanar with the support member 2, as hereinafter further described. Alternatively, the scaling panel 21 may be fixed to the corresponding edge of the support member 2 without using the panel hinge 23 and in each case, an open-ended panel slot 22 is provided in the scaling panel 21 to access a scaler 25. In a preferred embodiment the scaler 25 is characterized by an electric motor 26 having a motor handle 31 and an electric cord 26a, terminated by electric plug 26b. The motor shaft 27 of the motor 26 receives a scaling tool 28 which is fitted with multiple, resilient scale-removing members 30, such as plastic bristles, the ends of which contact the body portion 42 of the fish 40 and remove the scales responsive to rotation of the motor shaft 27. As further illustrated in FIGS. 1–4, the motor shaft 27 is inserted in the open-ended panel slot 22 when the scaling panel 21 is in the upright position, to facilitate sliding movement of the scale-removing members 30 along the entire length of the body portion 42 of the fish 40, as the scaler 25 is gripped by the motor handle 31, to remove scales from the body portion 42.

In another preferred embodiment of the invention, an optional transparent cover 32 includes a pair of transparent cover panels shaped in an inverted L-shaped configuration, wherein the top cover panel 33 extends horizontally from the vertically-oriented side cover panel 34 and an end cover panel 35 closes the opposite end of the top cover panel 33 from the head clamp pedestal 13, to cooperate with the scaling panel 21 and completely enclose the fish 40 inside the fish scaling device 1. This expedient contains scales which are removed from the fish 40.

As further illustrated in FIGS. 1–6 of the drawing, the head clamp pedestal 13 element of the head clamp 12 may be optionally hinged to the support member 2 by means of a pedestal hinge 20 at a point elevated from the bottom end of the head clamp pedestal 13. Accordingly, that portion of the head clamp pedestal 13 which extends downwardly beyond the pedestal hinge 20 forms a leg or foot for one end of the fish scaling device 1 and is equal in length to the end flange 3 provided on the opposite edge of the support member 2. This design elevates the support member 2 from the supporting surface and allows wash water to freely flow from the fish 40 through the tail clamp slots 5 and from beneath the support member 2.

In a most preferred embodiment of the invention, multiple dowel openings 18 are located in spaced relationship in the head clamp pedestal 13 for receiving a tapered dowel 19 that extends into the mouth 44 at the head 43 of the fish 40 to immobilize the head 43. Accordingly, with the tail 41 immobilized by operation of the tail clamp 6 and the head 43 secured by the head clamp 12, the scaling operation can be commenced without fear of excessive movement of the body portion 42 within the fish scaling device 1.

In yet another preferred embodiment of the invention, a peg 36 projects horizontally from the vertical edge of the head clamp 13 which faces the scaling panel 21 and a dowel opening 24 is provided in the scaling panel 21 in alignment with the peg 36, as illustrated in FIG. 8. The peg 36 is slightly oversized with respect to the dowel opening 24 to facilitate a tight fit of the peg 36 in the dowel opening 24 when the scaling panel 21 is closed in the upright configuration as illustrated in FIGS. 1-4. However, it is understood that the scaling panel 21 can be pivoted downwardly as illustrated in FIGS. 5 and 6 by applying sufficient force to the scaling panel 21 to remove the peg 36 from the dowel opening 24.

In operation, and referring again to the drawings, under circumstances where it is desired to enclose a fish 40 inside the fish scaling device 1 in order to avoid spreading scales into an area adjacent to the fish scaling device 1, the fish 40 is initially placed on the support member 2 with the head 43 facing the head clamp pedestal 13 of the head clamp 12 and the tail 41 facing the tail clamp bar 7 of the tail clamp 6. The fish 40 is then adjusted such that the mouth 44 lies in close proximity to the head clamp pedestal 13 and a dowel 19 is inserted through one of the dowel openings 18 which lies in substantial alignment with the mouth 44 of the fish 40. The dowel 19 is inserted into the mouth 44 through the dowel opening 18 until the dowel 19 is wedged in the dowel opening 18. The wing nuts 10, threaded on the bar bolts 9 in the tail clamp 6 are then loosened, the tail clamp bar 7 raised and the tail 41 of the fish 40 inserted between the tail clamp bar 7 and the support member 2. The bar bolts 9 and tail clamp bar 7 are then adjusted forwardly or rearwardly in the tail clamp slots 5 to facilitate tightening of the wing nuts 10 and pressing the tail clamp bar 7 tightly against the tail 41 to secure the tail 41 against the support member 2. The fish 40 is thusly immobilized on the support member 2 for scaling. The scaling panel 21 is then raised from a horizontal position illustrated in FIG. 6 to the vertical orientation illustrated in FIGS. 1-4 and is secured in that position by entry of the peg 36 in the corresponding dowel opening 24. The cover 32 is then placed into position over the support member 2 and the fish 40 to completely enclose the fish 40 inside the fish scaling device 1. The scaler 25 is positioned for scaling the fish 40 by inserting the motor shaft 27 through the open ended panel slot 22 by grasping the motor handle 31. When the electric plug 26b is plugged into a source of electric current (not illustrated) the motor 26 may be energized by operation of a switch (not illustrated) and the scale removing members 30 begin rotating to remove scales from the body portion 42 of the fish 40, as illustrated in FIG. 2. The scaler 25 can be moved horizontally throughout the full length of the panel slot 22, as necessary, to completely remove scales from one side of the body portion 42 of the fish 40. When the scaling operation is completed for the upwardly-facing side of the body portion 42, the fish 40 is removed from the head clamp 12 and the tail clamp 6 and is reversed, with the opposite side of the body portion 42 facing upwardly, where it is re-secured using the head clamp 12 and tail clamp 6, as described above. The scaler 25 is then utilized to scale the opposite side of the body portion 42 of the fish 40.

It will be appreciated by those skilled in the art that the fish scaling device of this invention is particularly well adapted for scaling fish under circumstances where it is desirable not to spread or scatter loose scales outside the fish scaling device 1. For example, under circumstances where the weather is inclement and the scaling must be accomplished indoors, on a patio or in some other area where it is not desirable to scatter the scales, the fish scaling device can be easily used to accomplish this purpose. Alternatively, it will be appreciated that the cover 32 can be removed and the scaling panel 21 pivoted downwardly to a horizontal, coplanar configuration with respect to the support member 2 and the fish scaling device 1 utilized outside or in an environment where it is not detrimental to have the fish scales spread beyond the fish scaling device 1. Furthermore, a conventional fish scaler (not illustrated) may be inserted through the panel slot 22 or used when the scaling panel 21 is opened coplanar with the support member 2, to scale the fish 40 in conventional manner.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A fish scaling device for enclosing and scaling a fish, comprising a support for receiving the fish tail; clamp means provided on said support for securing the tail of the fish to said support; head clamp means provided on said support for securing the head of the fish on said support; transparent cover means positioned on said support and enclosing the fish; an externally positioned electric motor having a motor shaft and a plurality of scale-removing members connected to said motor shaft; and a longitudinal panel slot provided in said transparent cover for permitting said motor shaft and said scale-removing members to extend within said cover, said longitudinal slot extending parallel to the fish, so that the displacement of said motor and scale-removing members along said slot cause the scaling of the fish inside said transparent cover.

2. The fish scaling device of claim 1 wherein said tail clamp means further comprises a pair of support slots provided in parallel relationship in said support, a pair of bolts projecting through said support slots, respectively, a tail clamp bar mounted on said bolts and spanning the tail of the fish and wing nuts threaded on said bolts for securing said tail clamp bar against the tail of the fish and the tail of the fish to said support.

3. The fish scaling device of claim 1 wherein said head clamp means further comprises a head clamp pedestal mounted on said support, at least two dowel openings provided in said head clamp pedestal and a tapered dowel for insertion in a selected one of said dowel openings and into the mouth of the fish for securing the head of the fish on said support.

4. The fish scaling device of claim 1 further comprising a scaling panel hingedly connected to said support and wherein said panel slot means is provided in said scaling panel and said transparent cover means is shaped generally in the configuration of an "L" for fitting on said support and engaging said scaling panel.

* * * * *